Sept. 17, 1940.   I. MERLIS   2,214,932
BAROMETRIC MULTIJET CONDENSER
Filed Aug. 23, 1938
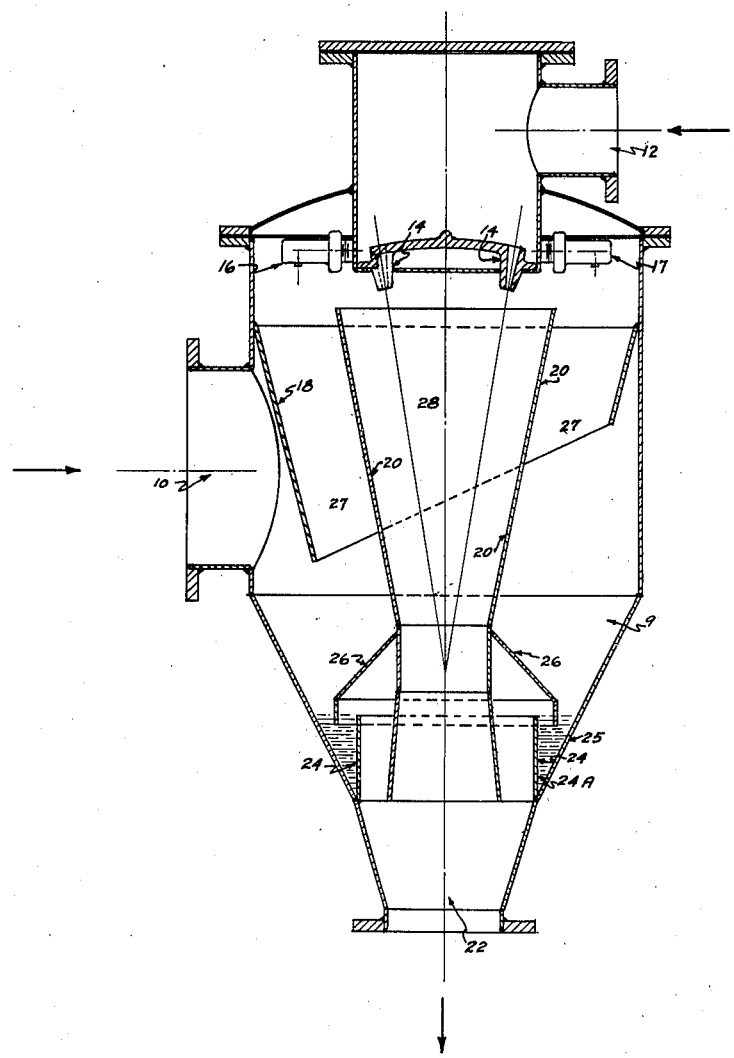
INVENTOR
Ira Merlis
BY
Harry Langsam
ATTORNEY Patented Sept. 17, 1940

2,214,932

UNITED STATES PATENT OFFICE 2,214,932

BAROMETRIC MULTIJET CONDENSER

Ira Merlis, Willow Grove, Pa., assignor to Acme Coppersmithing & Machine Company, Oreland, Pa., a corporation of Pennsylvania Application August 23, 1938, Serial No. 226,321

4 Claims. (Cl. 261—116)

My invention relates to a barometric spray condenser which will not only remove condensible vapors but also air and incondensible gases.

It is known that steam vapors carry air or other entrapped gases which usually are non-condensible with the steam or vapor. Unless the non-condensible air or gases are carried away they tend to reduce the efficiency of the entire unit.

It is therefore, an object of my invention to produce a barometric condenser which will remove either condensible vapors or non-condensible vapors or both.

Another object of my invention is to provide a counter-current flow of the condensing vapors and the condensing liquid.

Another object of my invention is to provide a liquid seal to prevent the fluid, such as vapors and liquids, from by-passing the desired path that they should take.

Another object of my invention is to provide in a barometric condenser a solid jet of condensing liquid which will carry with it the non-condensible gases and the residual condensible vapors.

Other objects of my invention are to provide an improved device of the character described, that is easily and economically produced, that is sturdy in construction, and which has a maximum efficiency in operation.

With the above and related objects in view, my invention consists in the details of construction and combination of parts, as will be more fully understood from the following description when read in conjunction with the accompanying drawing in which:

The sole figure shows a sectional view through the barometric condenser embodying my invention.

Referring now in detail to the drawing, I show a barometric condenser wherein vapor and cooling liquid are brought together in the same vessel 9.

The condensible vapors enter the vessel 9 through an inlet conduit 10, and the condensing or cooling liquid enters the vessel 9 from the top through the condensing liquid inlet 12. The inlet upper portion of the vessel is closed to the main chamber, and the condensing liquid enters into the main chamber through the solid jet converging nozzles 14, 14 and side spray nozzles 16, 17.

A downwardly extending baffle 18 partially closes the inner end of the inlet 10. The upper end of the baffle 18 is attached to the inner end of the inlet conduit, and the lower end of the baffle is spaced from the inlet and is also freely extending into the inner chamber. This arrangement of the baffle 18 compels the condensible vapors to pass downwardly around the baffle and then upwardly between the baffle and an inner central vortex-like tube 20.

The upper edge of the vertically arranged vortex-like tube is open, and it flares upwardly, and into its central portion is discharged the solid jet from the converging nozzles 14, 14. Hence, the condensible vapors pass upwardly between the baffle 18 and the outer side of the vortex tube, thus condensing the condensible vapors which fall downwardly as condensate. The non-condensible gases rise, and the suction created by the rapid discharge of the converging solid spray draws the non-condensible gases or air into the discharge passageway, and it also serves to condense some of the vapor that has not already been condensed.

It should be observed that the condensible fluid from inlet 10 moves counter-current to the condensing spray from the spray nozzles 16 and 17.

In order to give a definite counter-current path and thereby improve the efficiency of the unit, I provide a liquid seal about the lower end of the vessel 9. The seal prevents the passage of the condensible vapor direct from the inlet passageway to the discharge passageway; on the other hand, the condensible vapor must pass counter to the sprays emanating from nozzles 16 and 17. The seal enables condensing liquid from side sprays 16, 17 as well as condensate to pass into the central discharge nozzle without permitting vapor and gases to by-pass the seal.

The lower end liquid seal is composed of a circular vertically-arranged sheet of metal 24 adapted to retain some liquid between its outer wall and the inner conical wall 25 of the vessel 9, and dipping into the retained liquid 24A of the seal is the edge of a shielding truncated cone-like member 26 which is attached to the lower portion of the flared tube 20. Condensate drops between the wall 25 of the vessel 9 and the lower edge of the shield 26 into the reservoir defined by the walls 25 and 25. Because of the liquid holding seal 24A and the cone shield 26, the vapors cannot pass directly from the inlet passageway to the discharge passageway but must take the counter-current route upwardly through passageway 27, and if the vapor is not completely condensed in passageway 27, it is condensed in passageway 28, and the condensate as well as the condensing fluid shall pass into the single discharge opening 22.

Although my invention has been described in considerable detail, such description is intended as illustrative rather than limiting, since the invention may be variously embodied, and the scope of the invention is to be determined as claimed.

I claim:

1. In a barometric condenser a substantially closed vessel having a water inlet at the top, a discharge outlet at the bottom, a vapor inlet at the side, a vertically arranged flared tube, a deflecting plate at the inner end of said vapor inlet whereby the incoming vapors must pass downwardly about said plate, a chamber wherein said incoming vapors may rise, a plurality of spray nozzles within said chamber discharging in a counterdirection to the flow of the vapor, and a plurality of converging jets adapted to direct a stream of liquid downwardly into said flared tube.

2. In a barometric condenser a substantially closed vessel having a liquid inlet at the top, a discharge outlet at the bottom, a vapor inlet at the side, a vertically arranged flared tube, a deflecting plate at the inner end of said inlet whereby the incoming vapors must pass downwardly about said plate, a chamber wherein said incoming vapors may rise, a plurality of spray nozzles within said chamber discharging in a counterdirection to the flow of the vapor, a plurality of converging jets adapted to direct a stream of liquid downwardly into said flared unit, and a liquid seal between said inlet passageway and said discharging outlet.

3. A barometric condenser comprising a vessel and a liquid seal therein, said vessel open at its top for the reception of cooling liquid, means for distributing said cooling liquid partly into sprays for condensing vapors in countercurrent flow and partly into converging jets for removing incondensible gases and residual vapors in parallel current flow, and a tail pipe at the lower end thereof, said seal preventing direct exit of non-condensed vapors to the tail pipe.

4. In a barometric condenser, the combination of a casing open at its top for the reception of cooling fluid, and means for distributing said cooling fluid partly into sprays for condensing vapors in countercurrent flow and partly into converging jets for removing incondensible gases and residual condensible vapors in parallel current flow.

IRA MERLIS.